United States Patent Office 3,501,468
Patented Mar. 17, 1970

3,501,468
PROCESS FOR PREPARING CHLOROCYANURATE COMPOUNDS
Edward L. Moore, St. Louis, and William F. Symes, Webster Groves, Mo., assignors to Monsanto Company, St. Louis, Mo., a corporation of Delaware
No Drawing. Continuation of application Ser. No. 580,883, Sept. 21, 1966. This application Dec. 9, 1968, Ser. No. 785,030
Int. Cl. C07d 55/40
U.S. Cl. 260—248         2 Claims

ABSTRACT OF THE DISCLOSURE

A sodium-potassium cyanurate compound having a sodium to potassium to cyanuric acid ratio of from about 0.5:2:1 to about 3:1:1 is prepared by reacting cyanuric acid with an aqueous solution containing a mixture of potassium hydroxide and a sodium containing compound selected from the group consisting of sodium hydroxide, sodium oxide, and sodium carbonate in proportions sufficient to provide the required mole ratio at a temperature of less than 100° C. Chloroisocyanurate complex compounds selected from the group consisting of [(monotrichloro) tetra-(monopotassium dichloro)] penta-isocyanurate, and (monotrichloro)(monopotassium dichloro) di-isocyanurate and mixtures thereof which are useful as bleaching, sterilizing, oxidizing and disinfecting agents are prepared by introducing chlorine and an aqueous solution of the sodium potassium cyanurate into an aqueous slurry of the chloroisocyanurate complex compound maintained at a temperature between 0° C. and 50° C. at a rate sufficient to maintain the pH of the reaction medium from about 2.1 to less than 6.0.

---

This application is a continuation of United States Patent application Ser. No. 580,883 filed Sept. 21, 1966, now abandoned.

The present invention relates to the preparation of a novel bimetallic containing triazine salt, more particularly a sodium-potassium containing cyanurate. The present invention also relates to the preparation of polycyanurate complexes from the bimetallic triazine salt and more particularly to novel and improved processes for the manufacture of anhydrous [(monotrichloro) tetra-(monopotassium dichloro)] penta-isocyanurate and (trichloro)(monopotassium dichloro) di-isocyanurate utilizing such salt.

The aforementioned penta- and di-isocyanurates, hereinafter referred to, respectively, as Compounds I and II, or mixtures of such compounds, may be prepared by the various processes disclosed in U.S. Patent 3,150,132 issued to William F. Symes on Sept. 22, 1964. (Note that Compounds I and II described herein are the same as Compounds I and II set forth and described in the aforesaid Symes patent.) One of these processes comprises the reaction of certain proportions of monopotassium dichloroisocyanurate with trichloroisocyanuric acid at certain pH ranges to form the above named compounds. One method, disclosed in Example II of this patent, pertains solely to the preparation of Compound I and comprises reacting monopotassium dichloroisocyanurate with a mineral acid such as hydrochloric acid to form the penta-isocyanurate compound. A third procedure for producing either Compounds I or II is disclosed in Example III of the aforementioned Symes patent wherein chlorine and an aqueous solution of tripotassium cyanurate are continuously introduced into a reaction zone containing a heel of an aqueous slurry of Compounds I or II.

As is pointed out in column 12 of the aforesaid U.S. Patent 3,150,132, the direct chlorination process, described specifically in Example III, is considered to be the more economical method for preparing the aforementioned complex isocyanurates, i.e. Compounds I and II.

While such Compounds I and II can be prepared readily by the direct chlorination of tripotassium cyanurate as set forth in the Symes patent, U.S. 3,150,132, the utilization of potassium hydroxide (to form tripotassium cyanurate) is expensive and consequently renders the aforementioned Symes procedure less attractive, from an economic viewpoint, when carried out on a large scale commercial operation. Consequently, there is need for providing an improved direct chlorination method which substantially reduces the cost of the raw materials utilized in such Symes' method and which thus results in overall reduction in cost of the preparation of Compounds I or II.

It might be noted at this point that the prior art emphasizes the unique behavior of potassium cyanurates in the formation of the complex di- or penta-isocyanurates hereinbefore referred to, since such products are not obtained if one employs other alkali metal cyanurates, such as trisodium cyanurate or trilithium cyanurate, in combination with chlorine. In brief, the Symes patent U.S. 3,150,132 teaches or suggests quite strongly that it is essential as one method, to use tripotassium cyanurate and chlorine in order to prepare the aforementioned complex penta- or di-isocyanurate compounds, i.e. Compounds I and II.

In regard to the paragraph immediately above, the most unusual aspect of the present invention relates to the fact that it is well known in the art, as exemplified by the aforementioned Symes patent U.S. 3,150,132 and U.S. Patent 2,964,525 issued to William L. Robinson on Dec. 13, 1960, that when trisodium cyanurate (i.e. the reaction product of 3 mols NaOH and 1 mol of cyanuric acid) is substituted entirely for the tripotassium cyanurate and then chlorinated, the end result is not a sodium "complex" or a sodium containing di- or pentaisocyanurate but the end product is, in fact, trichlorocyanuric acid; note column 11, lines 55 through 75, and column 12, lines 1 through 14 of the Symes patent. As previously pointed out, the prior art (as exemplified by the said Symes patent) has chlorinated the tripotassium cyanurate which is the reaction product of potassium hydroxide and cyanuric acid to yield Compounds I and II. However, this method is expensive since it is well known that commercially available potassium hydroxide is about 2 to 3 times as expensive as commercially available sodium hydroxide. When practicing the novel processes of the present invention, the quantities of the expensive raw material, i.e. potassium hydroxide, are substantially reduced, the chlorination is more stable as hereinafter pointed out, and the said di- or penta-isocyanurate crystals formed are characterized by being fast settling and free draining which is generally not the case when only potassium hydroxide is used.

In accordance with the present invention, it has unexpectedly been found possible to significantly reduce the quantities of potassium hydroxide required to prepare the cyanurate material which is subsequently chlorinated to form Compounds I and II, by substituting a portion of the potassium hydroxide with certain materials, specifically alkali metal hydroxides other than potassium hydroxide, which per se are shown by the prior art (note Symes patent, column 11) to be incapable of use per se in the production of these compounds.

Accordingly, it is one object of the present invention to provide a process for the preparation of a bimetallic triazine salt, particularly a sodium-potassium cyanurate, which can be used as a starting material for manufacturing the aforementioned Compounds I or II.

It is another object of the present invention to provide an improved process for preparing the aforementioned Compounds I or II.

It is a further object of this invention to provide an improved process which results in a substantial reduction in operational costs of these improved processes due to the lower raw material cost.

Additional objects and advantages of the present invention will be or become apparent from the following description and the appended claims.

The present invention provides, in part, a sodium-potassium cyanurate having a Na:K:cyanuric acid atomic ratio within the range of from about 0.5:2.1 to about 3:1:1, preferably from about 1:1.75:1 to about 2.5:1:1, and more preferably from about 1.5:1.4:1 to about 2.25:1:1, which cyanurate may be chlorinated, for example, as hereinafter described, to form a complex potassium and chlorine containing cyanurate compound, which complex compound is the aforementioned Compound I or Compound II or mixtures thereof. In addition, the present invention provides a process of preparing such sodium-potassium cyanurate, which process, in general, comprises reacting cyanuric acid, either in the form of an anhydrous solid or an aqueous solution containing said acid, with an aqueous solution of a mixture of sodium hydroxide (or oxides or carbonates) and potassium hydroxide in sufficient proportions such as to provide the aforedescribed atomic ratio of Na:K:cyanuric acid ($H_3C_3N_3O_3$). The resulting solution of the cyanurate can be used as such or dried, for example, by spray or drum drying, to form a solid sodium-potassium cyanurate which can be economically stored for future use. It can thus be seen that the present invention provides a novel cyanurate salt containing significant quantities of both sodium and potassium cations and having the utility herein described.

As previously mentioned, the present invention also provides a process for utilizing the above-described sodium-potassium cyanurate in the preparation of Compounds I or II, that is, a potassium-containing chlorocyanurate complex compound from the group (a) [(monotrichloro) tetra-(monopotassium dichloro)]penta-isocyanurate, (b) (monotrichloro) (monopotassium dichloro) di-isocyanurate, or (c) mixtures of (a) and (b), which process comprises introducing chlorine and the above-described sodium-potassium cyanurate preferably in an aqueous solution having a pH in excess of 12 into an aqueous slurry of such potassium-containing chlorocyanurate complex compound contained in a reaction zone. The resulting slurry is preferably maintained at a temperature within the range of between 0° C. and 50° C. and the chlorine, either gaseous or liquid, and the novel sodium-potassium cyanurate are introduced into said slurry at a rate sufficient to maintain a pH therein within the range of from about 2.1 to less than 6.0, thereby forming additional quantities of the aqueous slurry of the complex compound in such reaction zone, which slurry has the aforedefined pH values. It is preferred to add the chlorine and the novel sodium-potassium cyanurate continuously to the aqueous slurry in the reaction zone and at a rate such as to maintain the pH of the slurry within the range given above. Under such conditions, it is also preferred to remove a portion of said aqueous slurry from such reaction zone and then the complex compound is separated from the bulk of the aqueous phase of the slurry thus removed. The portion of the aqueous slurry thus removed is preferably substantially equal in volume to the liquid volume of the reactants added to the reaction zone.

It is to be noted that the compounds designated by (a) and (b) above are structurally represented by the Formula I set forth below wherein (a) the aforementioned Compound I, the said penta-isocyanurate, is represented by the formula when $n$ is 4 and (b) the aforementioned Compound II, the said di-isocyanurate, is represented by the formula when $n$ is 1.

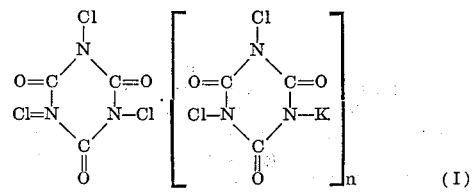

It will be understood throughout the present specification that various chemical terms are used interchangeably, specifically those relating to the cyanurates. For example, Compound I, i.e. the "penta-cyanurate" and "penta-isocyanurate" are the same compounds but connotate different tautomeric forms thereof. Consequently, both of these chemical terms are intended to mean the same compound and are used interchangeably herein.

As previously mentioned, one embodiment of the present invention relates to the preparation of the novel sodium-potassium cyanurate. This cyanurate may be suitably prepared by reacting a mixed hydroxide solution with cyanuric acid according to the following description. Specifically, the mixed hydroxide solution may be prepared by mixing water solutions of sodium hydroxide and potassium hydroxide in an amount sufficient to provide in such solution an atomic ratio of Na:K as heretofore described when used with one mol of cyanuric acid. The total concentration of the hydroxides in the aqueous solution preferably should be less than 60% by weight, and more preferably from about 20% to about 50% by weight.

The above-described aqueous solution of sodium and potassium hydroxides is reacted at a temperature less than 100° C., preferably between 0° C. and 50° C., for example, at room temperature of 15–25° C., with an aqueous dispersion containing less than 50% by weight of cyanuric acid, preferably from about 10% to about 35% by weight of cyanuric acid. The cyanuric acid and hydroxides are used in an amount as previously mentioned to provide a sodium-potassium cyanurate having Na:K:cyanuric acid atomic ratio of from about 0.5:2:1 to about 3:1:1, preferably from about 1:1.75:1 to about 2.5:1:1, and more preferably from about 1.5:1.4:1 to about 2.25:1:1. This Na:K:$H_3C_3N_3O_3$ ratio has been found to be desirable in order to produce the end product. Thus, if the ratio is less than 0.5:2:1, the end product obtained by chlorination of such cyanurate will contain other materials or impurities besides Compound I or II. If the ratio is higher than 3:1:1, the reaction becomes difficult to control and may even result in an explosion if significant quantities of $NCl_3$ are formed. When the proper amounts of hydroxides and cyanuric acid are reacted together, the resultant aqueous solution contains a dissolved solute phase which is the sodium-potassium cyanurate salt.

The aforementioned description is directed, then, towards the preparation of the novel sodium-potassium cyanurate which may be used as the starting material in the formation of the above-described Compounds I and/or II. It is believed that this novel cyanurate product either has a single cyanuric acid group containing the Na or K cations in its molecular structure or is in the form of a "complex" which has two or more cyanuric acid molecules which in turn contain the sodium and potassium cations therein as an intimate part of the overall molecular structure. However, these ideas are mere belief on behalf of the applicants who do not wish to be limited in their invention in any way whatsoever with these ideas or any other ideas or beliefs expressed herein.

As previously mentioned, the novel sodium-potassium cyanurate, having a Na:K:cyanuric acid ratio of from about 0.5:2:1 to about 3:1:1, is useful as the starting material for the preparation of the aforementioned Compounds I and II, which compounds are formed by the chlorination of such cyanurate. During this chlorination of the novel cyanurate, it is believed that the chlorine ions selectively replace all the sodium ions first in the cyanurate molecular structure but thereafter not all the potassium ions are replaced due to the pH being controlled within a certain range. Consequently, this unique selective mechanism of the chlorine ions permits the replacement of Na cations in the cyanurate molecule, supplied in the form of NaOH, Na$_2$O, Na$_2$CO$_2$, and the like, without any significant amount of the sodium cations remaining attached to the cyanurate structure after chlorination. The compounds, i.e. I and II, produced by the novel processes of this invention do, however, contain trace or small amounts of sodium chloride. Furthermore, from the experiments conducted in the course of this invention, it was noted, as hereinafter shown, that the presence of the sodium chloride, for example, from about 0.01% to about 1% by weight of said compounds, increased the stability of Compounds I and II.

The term "stability" as used herein connotates the degree to which a chlorine-containing compound does not lose "active or available" chlorine when said compound is subjected to a storage period under certain temperature and relative humidity conditions. Usually, the chlorine-containing compound is incorporated in, for example, a bleaching formulation in order to achieve an essentially stable product under practical or commercial conditions, i.e. during the normal "shelf-life" of a box of dry, solid bleach.

Referring again to the chlorination of the novel sodium-potassium cyanurate (which chlorination constitutes another aspect of the present invention) and in any event and whatever the reaction and/or mechanism, the feed solution, i.e. the novel sodium-potassium cyanurate contained in an aqueous solution or slurry, and chlorine, gaseous or liquid, are preferably continuously introduced into a reaction zone containing a heel of an aqueous slurry or heel of Compound I or II, depending on which compound or mixtures thereof one desires to prepare. Compound I or II can then be prepared by varying and controlling the rate at which chlorine and cyanurate are introduced into the reaction zone, such rate being controlled to maintain a pH of below about 6.0 and preferably not less than 2.1 whereby forming additional quantities of an aqueous slurry of Compound I or II in the reaction zone and thereafter continuously removing a portion of said aqueous slurry from said reaction zone. The desired end product, i.e. the potassium containing chlorocyanurate complex compound, i.e. Compound I or II, can then be separated from the bulk of the aqueous phase of the slurry and thus removed therefrom.

During the admixture of the chlorine and the novel sodium-potassium cyanurate (feed solution) in the aqueous slurry, i.e. the heel, the resulting reaction mixture is preferably continuously maintained at a temperature of from about 0° C. to about 50° C., more preferably from about 25° C. to about 35° C. The temperature used may be below 25° C. but there is no advantage and some loss of yield may be experienced at these temperatures due to incomplete chlorination. Although temperatures of 35° C. to 50° C. can be used, there is also some loss of yield at temperatures above 35° C. and it is desirable to maintain the temperature of the aqueous slurry between 25° C. and 35° C. and more preferably between 28° C. and 32° C. for optimum yields. Temperatures above 50° C. are preferably avoided due to excessive yield losses and decomposition of the triazine ring of the cyanurate.

Under the desirable conditions of temperature and pH, a substantially complete reaction takes place and there is thus formed additional quantities of Compound I or II in the resultant slurry at a specified pH, which pH is within the range of from about 6.0 to about 2.1 as described above. This slurry comprises a slurry of Compound I, suspended in the liquid reaction product where the pH has been held within the range of about 4.3 to about 6.0. Mixtures of Compounds I and II are produced when the pH of the slurry, during the introduction of chlorine and the sodium-potassium cyanurate, is within the range of about 3.5 to about 4.2. Compound II is formed when the pH of the slurry is held, during the chlorination procedure, at a pH within the range of about 2.1 to about 3.4. The above Compounds I or II or mixtures thereof are substantially insoluble in, and precipitate from, the aqueous medium, which medium is substantially an aqueous solution of potassium chloride and sodium chloride and which solution has the pH values referred to above.

If the pH of the aqueous slurry in the reaction zone is permitted to remain above 6.0, monopotassium dichloroisocyanurate or a mixture of monopotassium dichloroisocyanurate and Compound I may be formed. If the pH is above 6.5, none of Compound I will be formed. On the other hand, it is usually difficult to obtain a pH below 2.1, because of the buffering action of the dissolved reaction products even when large excesses of chlorine are employed. However, it has been noted that when the pH falls below 2.1 trichlorocyanuric acid is ultimately formed.

Compounds I or II or mixtures of said compounds formed in the above-described aqueous slurry are preferably continuously removed from the reaction zone together with a portion of the aqueous medium, so as to maintain the volume of the aqueous slurry in the reaction zone substantially constant. The product, in the slurry removed from the reaction zone, is next separated from the bulk of the aqueous medium with which it is associated in the aqueous slurry, by filtration, decantation, centrifugation, or the like, and may be dried or used, in certain applications, in the wet or undried state. However, if the product is desired with a low KCl and/or NaCl content, it is first preferably washed with water to remove all or substantially all of the potassium chloride and/or sodium chloride contained therein and is then dried (if a dry product is desired) to provide a dry or substantially dry solid product containing from about 0% to about 4%, preferably below 1.5%, by weight of moisture. (However and as previously mentioned, if all the NaCl is removed, the stability of the end product will not be as good as that product which contains some trace amounts, 0.01% to 1.0% by weight of NaCl.)

In a preferred embodiment of the present invention, there is provided a continuous process for preparing crystalline ](monotrichloro) tetra-(monopotassium dichloro)] penta-isocyanurate which process comprises first continuously introducing chlorine and a sodium-potassium cyanurate having a ratio of Na:K:cyanuric acid of from about 1:1.75:1 to about 2.5:1:1 (more preferably from about 1.5:1.4:1 to about 2.25:1:1 into an aqueous slurry of [(monotrichloro) tetra-(monopotassium dichloro)] penta-isocyanurate in a reaction zone, which slurry is maintained at a temperature within the range of from about 0° C. to about 50° C. The chlorine and such cyanurate are continuously introduced into the slurry at a rate sufficient to maintain a pH within the range of from about 4.3 to about 6.0, preferably from about 4.8 to about 5.5, thereby forming additional quantities of aqueous slurry of the penta-isocyanurate having the aforedefined pH in said reaction zone. Concurrently with such addition of chlorine and cyanurate, a portion of the aqueous slurry is continuously removed from the reaction zone in an amount sufficient to maintain the volume of the slurry in the reaction zone substantially constant. Subsequently, the [(monotrichloro) tetra-(monopotassium dichloro)] penta-isocyanurate is separated from the bulk of the aqueous phase of the slurry thus removed.

In another preferred embodiment of the present invention, there is provided a continuous process for preparing crystalline (mono-trichloro) (monopotassium dichloro) disocyanurate which process comprises first continuously introducing chlorine and a sodium-potassium cyanurate having a mol ratio of $Na:K:H_3C_3N_3O_3$ of from about 1:7.75:1 to about 2.5:1:1 (more preferably from about 1.5:1.4:1 to about 2.25:1:1) into an aqueous slurry of (mono-trichloro (monopotassium dichloro) di-isocyanurate in a reaction zone, which slurry is maintained at a temperature within the range of 0° C. to about 50° C. The chlorine and such cyanurate are continuously introduced into said slurry at a rate sufficient to maintain a pH within the range of from about 2.1 to about 3.4, preferably from about 2.3 to about 3.1, thereby forming additional quantities of aqueous slurry of said di-isocyanurate having the aforedefined pH in said reaction zone. Concurrently with such addition of chlorine and cyanurate, a portion of the aqueous slurry is continuously removed from the reaction zone in an amount sufficient to maintain the volume of the slurry in the reaction zone substantially constant. Subsequently, the (monotrichloro) (monopotassium dichloro) di-isocyanurate is separated from the bulk of the aqueous phase of the slurry thus removed.

In another embodiment of the present invention, there is provided a continuous process for preparing a mixture of crystalline [(monotrichloro) tetra-(monopotassium dichloro)] penta-isocyanurate and crystalline (mono-trichloro) (monopotassium dichloro) di-isocyanurate which comprises first continuously introducing chlorine and a sodium-potassium containing cyanurate having a ratio or $Na:K:H_3C_3N_3O_3$ of from about 1:1.75:1 to about 2.5:1:1 (more preferably from about 1.5:1.4:1 to about 2.25:1) into an aqueous slurry comprised of mixtures of the said di- and penta-isocyanurates in a reaction zone, which slurry is maintained at a temperature within the range of from about 0° C. to about 50° C. The chlorine and such cyanurate are continuously introduced into said slurry at a rate sufficient to maintain a pH within the range of from about 3.5 to about 4.2 thereby forming additional quantities of slurry of mixtures of said penta-isocyanurate and said di-isocyanurate in said reaction zone wherein the slurry formed has the aforedefined pH. Concurrently with such addition of chlorine and cyanurate, a portion of the aqueous slurry is continously removed from the reaction zone in an amount sufficient to maintain the volume of the slurry in the reaction zone substantially constant. Subsequently, a mixture of the di- and penta-isocyanurates is separated from the bulk of the aqueous phase of the slurry thus removed.

The anhydrous, crystalline, potassium-containing chloroisocyanurate compounds (I and II), produced by the novel processes of the present invention, either singly or when combined with other available chlorine-containing chlorocyanurates known in the prior art, generally constitute an "available chlorine-containing" compound which have utility as "active or available" chlorine containing materials, in oxidizing, sterilizing, bleaching, and sanitizing formulations, such as, for example, household laundry compositions, bleaches, scouring powders, and sanitizing and dishwashing compositions. Such compositions or formulations are described, for example, in detail in the Hardy patent U.S. 2,607,738 and U.S. Reissue Patent 24,412; U.S. 3,154,545; and U.S. 3,150,132.

A further understanding of the novel processes of the present invention will be obtained from the following examples which are intended to illustrate the invention, but not to limit the scope thereof, parts and percentages being by weight unless otherwise specified.

EXAMPLE I

Three hundred twenty grams of NaOH and 224 grams of KOH, providing a mol ratio of NaOH to KOH of 2:1, were dissolved in 4,800 grams of water. The resulting hydroxide solution was agitated for approximately 15 seconds by means of a mechanical stirrer and then mixed with approximately 516 grams of cyanuric acid (the ratio of Na:K:cyanuric acid was about 2:1:1) to form an aqueous solution having a pH of about 13.5 and containing a solute phase which was the herein described sodium-potassium cyanurate hereinafter referred to as the "feed solution" or "sodium-potassium cyanurate solution," both of which terms are used interchangeably. A sample of the solution containing such cyanurate was analyzed and found to contain substantially no NaOH or KOH materials which thus indicated that the $Na^+$ and $K^+$ ions were intimately part of the overall molecular and crystal structure of the sodium-potassium containing cyanurate material. Furthermore, an X-ray diffraction pattern obtained on the cyanurate material which was obtained by cooling a sample of the feed solution to 25° C. and filtering the solid material formed therein from the aqueous phase, indicated that this pattern was different from those X-ray diffraction patterns obtained on the mono-or di-sodium cyanurate or mono-potassium cyanurate. The results of these comparative patterns are disclosed in the attached Table I.

TABLE I.—X-RAY DIFFRACTION (XRD) PATTERNS [1]

| Present Invention Sodium-Potassium Cyanurate[H₂O] | Mono-Sodium Cyanurate $NaH_2C_3N_3O_3 \cdot H_2O$ | Mono-Potassium Cyanurate $KH_2C_3N_3O_3 \cdot H_2O$ | Di-Sodium Cyanurate $Na_2HC_3N_3O_3 \cdot H_2O$ |
|---|---|---|---|
| 29.2 | 28.3 | 32.7 | 14.0 |
| 28.2 | 09.6 | 29.0 | 15.5 |
| 22.2 | 13.8 | 21.6 | 23.4 |
| 26.9 | 31.2 | 44.1 | 25.5 |
| 29.8 | 19.4 | 34.7 | 27.0 |
| 33.2 | 21.5 | 30.3 | 28.9 |
| 35.5 | 27.2 | 26.8 | 29.5 |
| 37.7 | 29.2 | 16.4 | 31.5 |
|  | 30.3 | 10.7 | 30.0 |
|  | 40.9 |  | 32.9 |
|  | 39.4 |  | 35.8 |

[1] Reference Base: 2 theta values, Copper, K-alpha; values given in decreasing order of intensity.

EXAMPLE II

In order to demonstrate the utility of the sodium-potassium cyanurate and a novel process which is an improvement over the prior art processes, for example, U.S. 3,150,132, of preparing the herein described Compound I, the following procedure was carried out.

Approximately 900 ml. of an aqueous slurry having a pH of about 5.5 and containing about 10% by weight of [(monotrichloro) tetra - (monopotassium dichloro)]penta-isocyanurate (Compound I), prepared according to the method of Example I of U.S. Patent 3,150,132, was charged to a chlorination vessel, which vessel comprised a jacketed cylindrical glass container having an internal diameter of 5 inches and an internal height of 13 inches which container was supplied with three equidistantly spaced vertical baffles of 1 inch width, spaced radially inwardly 1 inch from the inside wall of the container. The total capacity of the container was about 3.5 liters of solution. Agitation was provided by a shaft mounted coincident with the vertical axis of the container and provided with a six-bladed turbine propeller of 2 inch diameter spaced 2 inches above the inside of the bottom of the container and a second six-bladed turbine propeller of 2 inch diameter spaced 5 inches above the first mentioned propeller. The shaft and propellers were rotated at 2300 revolutions per minute or a propeller tip speed of 1200 feet per minute. The container was also provided with a tube for introducing the aforementioned aqueous "feed solution" into the bottom of the container beneath the lowest propeller.

The container was also provided with an "outlet" tube extending vertically downward into the container a distance of 10 inches from the bottom of the container for the removal of reaction products. At such distance the top surface of the 900 ml. of slurry was in contact with the "outlet" tube and enabled the maintainment of a constant volume of 900 ml.

The aforementioned "feed solution" prepared in the above-described Example I (present invention) and which had been cooled to a temperature of 25° C. by means of an ice bath was then introduced continuously into the aqueous slurry in the container, with agitation, at the speed described above, and concurrently, gaseous chlorine was introduced into the aqueous slurry in an amount and rate sufficient to maintain the pH at 4.8 and to maintain a constant temperature of 29° C. The volume of the aqueous slurry in the container was maintained constant at 900 ml. by continually pumping a portion of the aqueous slurry, which contained a portion of Compound I, i.e. the said penta-isocyanurate, from the vessel through the removal or "outlet" tube. The rate of pumping was a rate sufficient to permit the chlorination of 40 ml. of the slurry per minute while maintaining the volume constant at 900 ml. and the resulting chlorinated slurry, which contained Compound I, was collected in a glass carboy. The continuous chlorination reaction was continued for 1 hour or until 3300 ml. of the liquid slurry had been chlorinated. The collected chlorinated slurry (3300 ml.) was then filtered through filter paper on a Buchner funnel; the resulting filter cake washed three times with 20 ml. increments of distilled water and dried to constant weight in an oven set at 100° C. The product consisted of 370 grams of a white crystalline material with a buff colored tinge which quantity amounted to a product yield of 76% based on the cyanuric acid employed. The white crystalline material was analyzed and found to contain 0.75% by weight NaCl and 0.01% KCl. The product was found to contain 66.7% of available chlorine. A typical elemental analysis of the crystalline compound is shown in Table II below along with the elemental analyses of the compounds produced in accordance with the procedure of Examples I, II, and III of U.S. Patent 3,150,132.

chemical tests were conducted on said compound as heretofore described. The results of these tests were substantially the same as those results heretofore set forth (with the exception that the weight percent NaCl and KCl were both 0.05%) and thus identify the compound produced as the said penta-isocyanurate, i.e. Compound I.

Although the above-described crystalline Compound (I) was prepared by an improved process, i.e. an improvement over the process as particularly described and set forth in Example III of U.S. Patent 3,150,132, it can readily be seen that said compound has been identified as being chemically identical and conforms to the material described as Compound I [(monotrichloro) tetra-(monopotassium dichloro)] penta-isocyanurate, in U.S. Patent 3,150,132 and falls within the structural Formula I hereinbefore set forth when $n$ is 4.

EXAMPLE III

Compound II was prepared by the following procedure.

Three hundred twenty grams of NaOH and 224 grams of KOH, providing a mol ratio of NaOH to KOH of 2:1, were dissolved in 4,800 grams of water. Approximately 516 grams of cyanuric acid were then added to the mixed hydroxide solution, while said solution was continuously agitated, to form an aqueous "feed solution" having a pH of about 13.5 and containing a solid phase which was the sodium-potassium cyanurate. (The mol ratio of Na:K:$H_3C_3N_3O_3$ was about 2:1:1.) This feed solution was then cooled, by an ice bath, to a temperature of about 23° C.

Approximately 900 ml. of an aqueous slurry having a pH of about 2.8 and containing about 10% by weight of (trichloro)(monopotassium) di-isocyanurate (Compound II), prepared according to the procedure outlined in Example IV of U.S. Patent 3,150,132, was charged to the chlorination vessel described in the above Example I (present invention). The aforementioned "feed solution" was then introduced continuously into the aqueous slurry in the container, with agitation, at the speed described in the above Example I (present invention), and concurrently, gaseous chlorine was introduced into the aqueous slurry in an amount and rate sufficient to maintain the pH at 2.8 and to maintain a constant temperature of 28° C. The volume of the aqueous slurry in the container was maintained constant at 900 ml. by continually pumping a portion of the aqueous slurry, which contained a portion of Compound II, i.e. the said di-isocyanurate, from the vessel through the removal or "outlet" tube. The rate of pumping was a rate sufficient to permit the

TABLE II.—ELEMENTAL ANALYSES OF CRYSTALLINE COMPOUND PRODUCED

| Element | Calculated, Theoretical | Found | | | |
| --- | --- | --- | --- | --- | --- |
| | | U.S. 3,150,132 Example I | U.S. 3,150,132 Example II | U.S. 3,150,132 Example III | Present Invention Example I |
| Carbon (percent) | 15.29 | 15.40 | 15.27 | 15.24 | 15.25 |
| Nitrogen (percent) | 17.84 | 17.96 | 17.95 | 18.03 | 17.98 |
| Chlorine (percent) | 33.19 | 33.15 | 33.14 | 32.92 | 33.11 |
| Potassium (percent) | 13.29 | 13.35 | 14.00 | 13.36 | 13.31 |

The X-ray diffraction pattern, available chlorine content and infrared absorption spectra data obtained from the analyses of the crystalline compound produced by following the procedure of the above described Example II (i.e. present invention) were all similar to the corresponding data obtained from the analyses of Compound I of U.S. Patent 3,150,132.

The above-described Example I (present invention) was repeated with the following exceptions. The quantities of sodium and potassium hydroxides and cyanuric acid utilized were such that the ratio of Na:K:cyanuric acid was 1:2:1, and the temperature and pH of the aqueous slurry, i.e. heel and resultant slurry, in the chlorinator were continuously maintained at about 33° C. and 5.0, respectively. A white crystalline compound was produced by this procedure and similar analytical and chlorination of 39 ml. of the slurry per minute while maintaining the volume constant at about 900 ml. The resulting chlorinated slurry, which contained Compound II, was collected in a glass carboy. The continuous chlorination reaction was continued for 1 hour or until about 3,250 ml. of the liquid slurry had been chlorinated. The collected chlorinated slurry (3,250 ml.) was then filtered through filter paper on a Buchner funnel; the resulting filter cake washed three times with about 20 ml. increments of distilled water and dried to constant weight in an oven set at 104° C. A sample of the material so dried analyzed to contain 0.61% by weight NaCl and 0.24% by weight KCl.

A white crystalline compound was produced by the above procedure and similar analytical and chemical tests were conducted on said compound as heretofore described in the above Example I (present invention). The results of these tests were also substantially the same as those results obtained in Tables IV, V and VI of U.S. Patent 3,150,132 and thus identify the compound produced in the Example II (present invention) as Compound II which compound is also the same (trichloro)(monopotassium) di-isocyanurate material produced in Example V of said patent.

In view of the results obtained in Examples II and III herein described, it can readily be seen that the partial substitution of sodium cations for potassium cations as part of the cyanurate salt and the subsequent chlorination of the resultant product of said reaction, i.e. novel sodium-potassium cyanurate, produce the same di- or penta-isocyanurates as when potassium hydroxide per se is used alone.

It was noted during the procedures set forth in Examples II and III that the chlorination of the novel sodium-potassium cyanurate proceeded quite smoothly and that the freshly precipitated di- or penta-isocyanurate crystals formed were characterized by being fast settling and were easily removed from the aqueous phase of the resulting slurry. In addition to this facet of the operation, it was also noted that the presence of the sodium as sodium chloride in the dried di-or penta-isocyanurate product had a stabilizing influence. Specifically, the said penta-isocyanurate which was prepared by a process similar to Example III of U.S. Patent 3,150,132 and which was completely free of sodium chloride was stored for 35 days at 92° F. and 85% relative humidity. At the end of this time, it was determined that the said penta-isocyanurate had lost 3.3% available chlorine. This result was then contrasted to the said penta-isocyanurate, which was prepared from a feed solution containing a sodium hydroxide to potassium hydroxide molar ratio of 2:1 (and a sufficient amount of cyanuric acid to yield a final ratio of Na:K:cyanuric acid of about 2:1:1) and which was stored under similar conditions, and which exhibited only a 2% loss of available chlorine. This same effect was also noted with the di-isocyanurate. Thus, it can readily be seen that in addition to the cost reduction in the raw materials as heretofore mentioned, the end result of the partial substitution of sodium cations for potassium cations (contained in the molecular structure of the novel cyanurate) also results in a product which has improved (available chlorine) stability over an extended storage period.

While the aforementioned disclosure including the examples has been directed to the use of sodium hydroxide as the source of supply for the sodium cations, it is to be understood that it is within the scope of the present invention to utilize other materials as a source of the sodium cations. Such materials, providing of course that they are less expensive than potassium hydroxide, may include, for example, $Na_2O$, $Na_2CO_3$, and the like.

What is claimed is:

1. A process for preparing a crystalline, potassium containing chloroisocyanurate complex compound selected from the group consisting of [(monotrichloro) tetra-(monopotassium dichloro)] penta-isocyanurate, (monotrichloro)(monopotassium dichloro) di-isocyanurate and mixtures thereof, said process comprising:

(A) reacting at a temperature less than 100° C. cyanuric acid with an aqueous solution containing a mixture of (i) a sodium containing compound selected from the group consisting of sodium hydroxide, sodium oxide, and sodium carbonate and (ii) potassium hydroxide in amounts such that the mole ratio of sodium to potassium to cyanuric acid is from about 0.5:2:1 to about 3:1:1, (B) introducing the solution prepared according to step A above and chlorine into an aqueous slurry of said potassium containing chloroisocyanurate complex compound in a reaction zone, which slurry is maintained at a temperature within the range of between 0° C. and 50° C., said chlorine and said solution being introduced into said slurry at a rate sufficient to maintain a pH within the range of about 2.1 to less than 6.0, thereby forming additional quantities of aqueous slurry of said complex compound in said reaction zone, which slurry has the aforedefined pH, (C) removing a portion of said aqueous slurry from said reaction zone and separating said complex compound from the bulk of the aqueous phase of slurry thus removed.

2. A process as set forth in claim 1 wherein the reaction of step A is conducted at a temperature of from about 0° C. to about 50° C. and the mole ratio of sodium to potassium to cyanuric acid is from about 1:1.75:1 to about 2.5:1:1.

References Cited

UNITED STATES PATENTS

| | | | |
|---|---|---|---|
| 2,607,738 | 8/1952 | Hardy | 260—248 XR |
| 2,964,525 | 12/1960 | Robinson | 260—248 |
| 3,035,056 | 5/1962 | Symes | 260—248 |
| 3,035,057 | 5/1962 | Symes et al. | 260—248 |
| 3,150,132 | 9/1964 | Symes | 260—248 |
| 3,184,458 | 5/1965 | Frazier | 260—248 |

HENRY R. JILES, Primary Examiner

JOHN M. FORD, Assistant Examiner

U.S. Cl. X.R.

252—187; 260—999

PO-1050
(5/89)

UNITED STATES PATENT OFFICE
CERTIFICATE OF CORRECTION

Patent No. 3,501,468　　　　　　　　Dated　March 17, 1970

Inventor(s)　Edward L. Moore and William F. Symes

It is certified that error appears in the above-identified patent and that said Letters Patent are hereby corrected as shown below:

Column 3, line 15, the ratio "0.5:2.1" should read -- 0.5:2:1 --.
Column 7, line 30, the ratio "2.25:1" should read -- 2.25:1:1 --.
Column 8, lines 6 and 7, the word "bein" should read -- being --.
Column 8, Table 1, the description of column 1 "Sodium-Potassium Cyanurate [$H_2O$" should read -- Sodium-Potassium Cyanurate·$H_2O$ --.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents